(12) United States Patent
Miyazawa et al.

(10) Patent No.: US 7,244,486 B2
(45) Date of Patent: Jul. 17, 2007

(54) OPTICAL RECORDING MEDIUM AND OPTICAL RECORDING METHOD

(75) Inventors: Takashi Miyazawa, Tokyo (JP); Yutaka Kurose, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 383 days.

(21) Appl. No.: 11/041,744

(22) Filed: Jan. 25, 2005

(65) Prior Publication Data

US 2005/0158505 A1 Jul. 21, 2005

Related U.S. Application Data

(63) Continuation of application No. PCT/JP04/02734, filed on Mar. 4, 2004.

(30) Foreign Application Priority Data

Aug. 12, 2003 (JP) .............. 2003-291973

(51) Int. Cl.
*B32B 3/02* (2006.01)
(52) U.S. Cl. ............. 428/64.1; 428/64.4; 428/64.8; 430/270.14
(58) Field of Classification Search ......... 428/64.1, 428/64.4, 64.8; 430/270.14
See application file for complete search history.

(56) References Cited

U.S. PATENT DOCUMENTS 6,815,033 B2* 11/2004 Miyazawa et al. ......... 428/64.1

FOREIGN PATENT DOCUMENTS

| JP | 2000-43423 | 2/2000 |
|---|---|---|
| JP | 2002-160452 | 6/2002 |

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

An organic dye type optical recording medium capable of recording or reading information by a blue laser having a shorter wavelength, is provided.

An optical recording medium comprising a substrate and a recording layer capable of recording or reading information by a laser, formed on the substrate, characterized in that the recording layer contains a compound represented by the following formula (1):

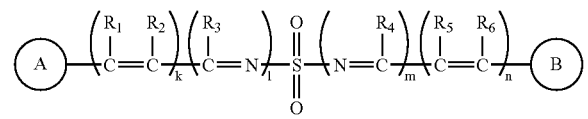

(1)

wherein each of $R_1$ to $R_6$ which are independent of one another, is a hydrogen atom or a linear or branched alkyl group which may be substituted, each of k and n which are independent of each other, is an integer of from 0 to 2, provided $0 \leq k+n \leq 4$, each of l and m which are independent of each other, is 0 or 1, provided $1 \leq l+m \leq 2$, each of rings A and B which are independent of each other, is an aromatic ring which may have optional substituents, provided that such optional substituents may be bonded to each other to form a ring.

5 Claims, 1 Drawing Sheet

OPTICAL RECORDING MEDIUM AND OPTICAL RECORDING METHOD

TECHNICAL FIELD

The present invention relates to an optical recording medium employing an organic dye in a recording layer and an optical recording method therefor. More particularly, it relates to an optical recording medium capable of recording or reading information by a blue laser, and an optical recording method therefor.

BACKGROUND ART

At present, various optical recording media such as CD-R/RW, DVD±R/RW and MO, are widely accepted and used as external storage devices for information processing systems such as computers, since they can store information of a large capacity and whereby random access is easy. Among them, an organic dye type optical recording medium represented by CD-R or DVD-R is considered to have superiority in that it is less costly and easy to produce.

Further, as the volume of information to be processed has increased, it is desired to increase the recording density of a medium. In recent years, an optical recording medium capable of high density recording and reading has been recommended which employs a laser having a short oscillation wavelength (so-called short wavelength laser) such as a blue laser, which has been actively developed (e.g. JP-A-2000-043423).

Usually, in the case of an optical recording medium commercially available as CD-R or DVD-R, for example, CD-R is designed to be suitable for recording or reading by a laser beam having a wavelength of about 780 nm, and DVD-R is designed to be suitable for recording or reading by a laser beam having a wavelength of from about 600 to 700 nm. Such a recording medium which is suitable for optical recording or reading by means of a laser beam having a relatively long wavelength, has a problem that if recording or reading is carried out by means of a laser of a shorter wavelength, the reflectance is so low that it is impossible to carry out recording or reading. Here, the blue laser is usually meant for a laser having a wavelength of from about 350 nm to 530 nm.

DISCLOSURE OF THE INVENTION

It is an object of the present invention to provide an organic dye type optical recording medium capable of recording or reading by means of a blue laser having a short wavelength.

The present inventors have conducted various studies on organic dyes having high sensitivity to a blue semiconductor laser and as a result, have found it possible to use a compound represented by the following formula (1) in a recording layer or an optical recording medium suitable for a blue semiconductor laser, whereupon the present invention has been accomplished.

Namely, the gist of the present invention resides in an optical recording medium comprising a substrate and a recording layer capable of recording or reading information by a laser, formed on the substrate, wherein the recording layer contains a compound represented by the following formula (1), and an optical recording method, wherein recording of information is carried out on such an optical recording medium by using a laser beam having a wavelength of from 350 nm to 530 nm.

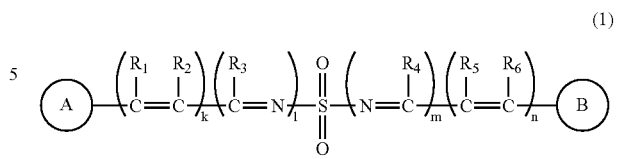

(1)

wherein each of $R_1$ to $R_6$ which are independent of one another, is a hydrogen atom or a linear or branched alkyl group which may be substituted, each of k and n which are independent of each other, is an integer of from 0 to 2, provided $0 \leq k+n \leq 4$, each of l and m which are independent of each other, is 0 or 1, provided $1 \leq l+m \leq 2$, each of rings A and B which are independent of each other, is an aromatic ring which may have optional substituents, provided that such optional substituents may be bonded to each other to form a fused ring.

EFFECT OF THE INVENTION

A solution containing the compound of the present invention is capable of forming a coated film having absorption suitable for recording or reading by means of a laser beam having a short wavelength and is excellent also in a film-forming property. Accordingly, a recording medium having a recording layer in which the compound of the present invention is used, is useful as an optical recording medium for recording and reading suitable for a short wavelength laser.

BEST MODE FOR CARRYING OUT THE INVENTION

Figure 1:
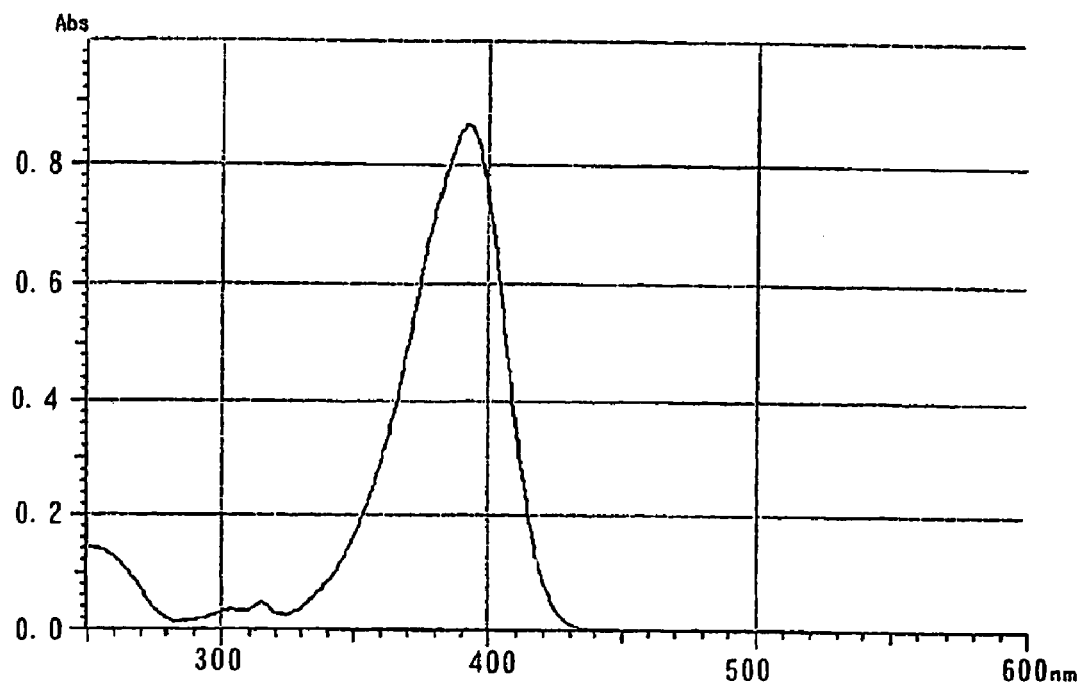
FIG. 1 is an absorption spectrum in a chloroform solution, of the compound synthesized in Example 1.

Now, the present invention will be described in detail.

The compound to be used in the present invention is preferably a dye compound which has a proper degree of absorption in a blue light region of from 350 to 530 nm and which is suitable for recording by means of a blue laser. In the present invention, a dye compound represented by the above formula (1) is used as such a dye. Now, the compound represented by the above formula (1) will be described.

In the above formula (1) representing the compound according to the present invention, each of $R_1$ to $R_6$ which are independent of one another, is a hydrogen atom, or a linear or branched alkyl group which may be substituted. Each of $R_1$ to $R_6$ which are independent of one another, is preferably a hydrogen atom or a linear alkyl group which may be substituted, particularly preferably a hydrogen atom or an unsubstituted $C_{1-3}$ linear alkyl group. Specifically, it is a methyl group, an ethyl group or a propyl group.

Further, each of k, l, m and n represents the number of unsaturated bonds. Each of k and n represents the number of C=C double bonds, and each of l and m represents the number of C=N double bonds. Each of k and n which are independent of each other, is an integer of from 0 to 2, and $0 \leq k+n \leq 4$. Each of l and m which are independent of each other, is 0 or 1, and $1 \leq l+m \leq 2$.

Here, the above formula (1) will be represented by the following formula, when rings A and B are represented by benzene rings for convenience sake.

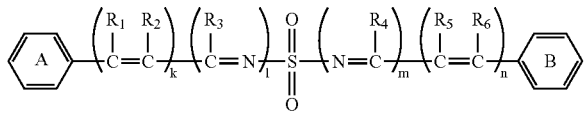

Specific examples of the structures are shown below wherein in the above formula, k and n are varied, while l and m are not changed (wherein each of $R_1'$ to $R_6'$ which are independent of one another, may be the same group as for the above-mentioned $R_1$ to $R_6$).

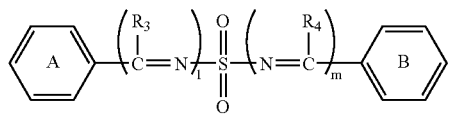

k = 0, n = 0

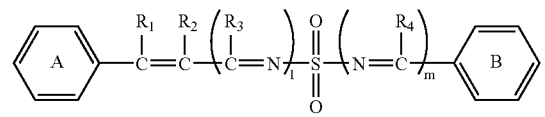

k = 1, n = 0

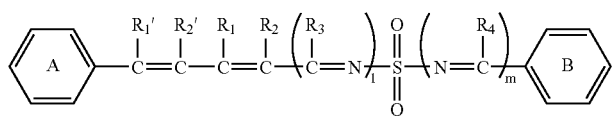

k = 2, n = 0

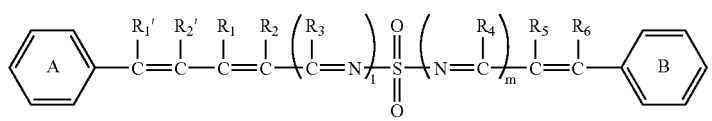

k = 2, n = 1

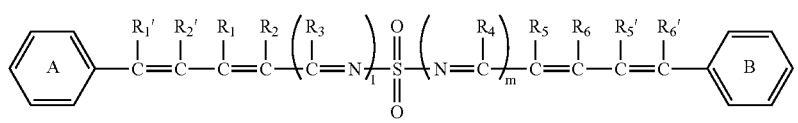

k = 2, n = 2

The values of k and n are determined depending upon e.g. the structures of rings A and B, and the types of substituents on the rings. However, usually each of k and n which are independent of each other, is preferably 0 or 1 and $0 \leq k+n \leq 2$.

Whereas, specific examples of structures will be shown below in the case where in the above-mentioned formula, l and m are varied while k and n are not changed.

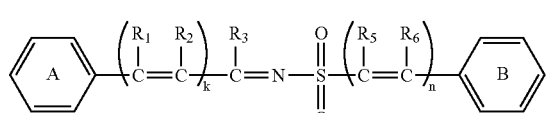

l = 1, m = 0

-continued

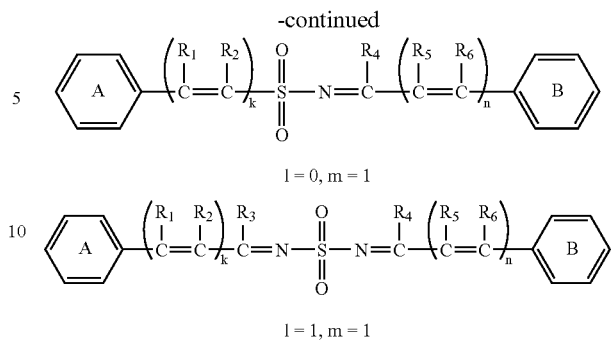

l = 0, m = 1 l = 1, m = 1

The values of l and m are determined by e.g. the structures of rings A and B, and the types of substituents on the rings. However, usually, each of l and m which are independent of each other, is preferably 0 or 1, and $1 \leq l+m \leq 2$, more preferably l+m=1.

In the above formula (1), each of rings A and B which are independent of each other, is an aromatic ring which may have optional substituents, provided that the optional substituents may be bonded to each other to form a fused ring. Such an aromatic ring may, for example, be an aromatic hydrocarbon ring such as a benzene ring or a naphthyl ring, or an aromatic hetero ring such as a furan ring, a pyridine ring or a quinoline ring, but it is not limited thereto.

In the present invention, it is preferred to use a 5- or 6-membered single ring or 2 or 3 condensed ring, as the aromatic ring. The structure of the 5- or 6-membered single ring or 2 or 3 condensed ring thereof is not particularly limited, but the following aromatic ring structures may, for example, be mentioned.

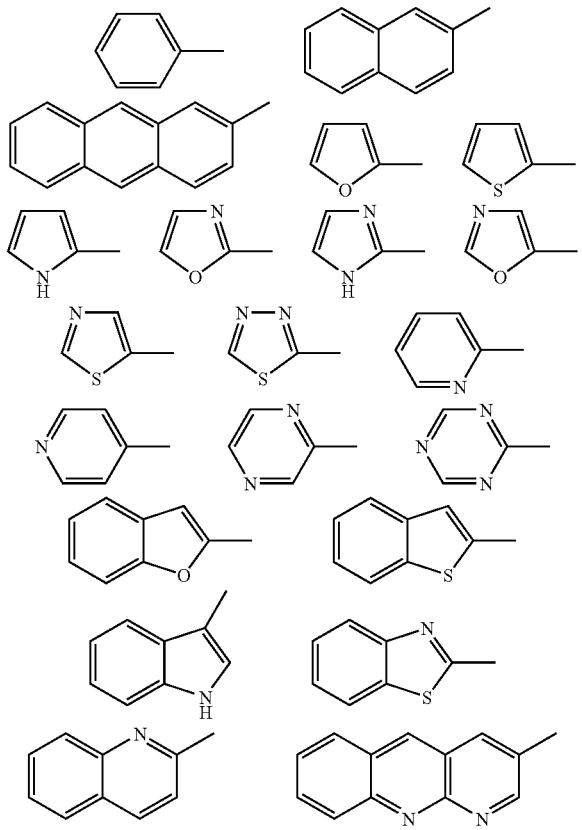

Among them, particularly preferred may be a hydrocarbon ring or hetero ring structure which is a 5- or 6-membered single ring or 2 condensed ring.

In the present invention, the aromatic ring represented by ring A or B may have a substituent. As an individually employed substituent, an optional one may be employed, or it may further be substituted. However, if it is too large, it gives an unexpected influence over the basic structure. Therefore, the molecular weight of the substituent is usually at most 1000, preferably at most 400. There is no particular lower limit, and it is usually at least 1.

The following may be mentioned as examples of the optional substituents. Namely, there may be mentioned a $C_{1-18}$ linear or branched alkyl group which may be substituted, such as a methyl group, an ethyl group, a propyl group, an isopropyl group, a n-butyl group, a sec-butyl group, a tert-butyl group or a n-heptyl group; a $C_{3-18}$ cyclic alkyl group which may be substituted, such as a cyclopropyl group, a cyclopentyl group, a cyclohexyl group or an adamantyl group; a $C_{2-18}$ linear or branched alkenyl group which may be substituted, such as a vinyl group, a propenyl group or a hexenyl group; a $C_{3-18}$ cyclic alkenyl group which may be substituted, such as a cyclopentenyl group or a cyclohexenyl group; a heterocyclic group which may be substituted such as a 2-thienyl group, a 2-pyridyl group, a 4-piperidyl group or a morpholino group; a $C_{6-18}$ aryl group such as a phenyl group, a tolyl group, a xylyl group or a mesityl group; a $C_{7-20}$ aralkyl group which may be substituted, such as a benzyl group or a phenethyl group; a $C_{1-18}$ linear or branched alkoxy group which may be substituted, such as a methoxy group, an ethoxy group, a n-propoxy group, an isopropoxy group, a n-butoxy group, a sec-butoxy group or a tert-butoxy group; a $C_{3-18}$ linear or branched alkenyloxy group which may be substituted, such as a propenyloxy group, a butenyloxy group or a pentenyloxy group; or a $C_{1-18}$ linear or branched alkylthio group which may be substituted, such as a methylthio group, an ethylthio group, a n-propylthio group, a n-butylthio group, a sec-butylthio group or a tert-butylthio group.

Other specific examples may, for example, be a halogen atom such as a fluorine atom, a chlorine atom or a bromine atom; a nitro group; a nitroso group; a cyano group; an isocyano group; a cyanate group; an isocyanate group; a thiocyanate group; an isothiocyanate group; a mercapto group; a hydroxyl group; a hydroxyamino group; a formyl group; a sulfonic acid group; carboxyl group; an acryl group represented by —$COR_7$; an amino group represented by —$NR_8R_9$; an acylamino group represented by —$NHCOR_{10}$; a carbamate group represented by —$NHCOOR_{11}$; a carboxylate group represented by —$COOR_{12}$; an acyloxy group represented by —$OCOR_{13}$; a carbamoyl group represented by —$CONR_{14}R_{15}$; a sulfonyl group represented by —$SO_2R_{16}$; a sulfamoyl group represented by —$SO_2NR_{17}NR_{18}$; a sulfonate group represented by —$SO_3R_{19}$; and a sulfonamide group represented by —$NHSO_2R_{20}$.

The positions of these substituents are not particularly limited, and the number of substituents may also be within an optional range. Where a plurality of substituents are present, they may be of the same type or different types.

Here, each of $R_7$, $R_{10}$, $R_{11}$, $R_{12}$, $R_{13}$, $R_{16}$, $R_{19}$ and $R_{20}$ represents a hydrocarbon group which may be substituted, or a heterocyclic group which may be substituted, and each of $R_8$, $R_9$, $R_{14}$, $R_{15}$, $R_{17}$ and $R_{18}$ represents a hydrogen atom, a hydrocarbon group which may be substituted, or a heterocyclic group which may be substituted.

The hydrocarbon group represented by $R_7$ to $R_{20}$ may, for example, be a linear or branched alkyl group, a cyclic alkyl group, a linear or branched alkenyl group, a cyclic alkenyl group, an aralkyl group or an aryl group.

It is particularly preferably a $C_{1-18}$ linear or branched alkyl group such as a methyl group, an ethyl group, a propyl group, an isopropyl group, a n-butyl group, a sec-butyl group, a tert-butyl group or a n-heptyl group; a $C_{3-18}$ cyclic alkyl group such as a cyclopropyl group, a cyclopentyl group, a cyclohexyl group or an adamantyl group; a $C_{2-18}$ linear or branched alkenyl group such as a vinyl group, a propenyl group or a hexenyl group; a $C_{3-18}$ cyclic alkenyl group such as a cyclopentenyl group or a cyclohexenyl group; a $C_{7-20}$ aralkyl group such as a benzyl group or a phenethyl group; or a $C_{6-18}$ aryl group such as a phenyl group, a tolyl group, a xylyl group or a mesityl group.

The aryl group moiety of such a group may further be substituted by a substituent similar to the one on the above-mentioned ring A or B. Further, the alkyl chain moiety of such a group may further be substituted by a substituent which will be described hereinafter.

Further, the heterocyclic group represented by $R_7$ to $R_{20}$ may be a saturated hetero ring such as a 4-piperidyl group, a morpholino group, a 2-morpholinyl group or a piperazyl group, or an aromatic hetero ring such as a 2-furyl group, a 2-pyridyl group, a 2-thiazolyl group or a 2-quinolyl group. Further, such a heterocyclic group may contain a plurality of hetero atoms, or may further have a substituent, and its bonding position is not limited. A preferred structure as such a hetero ring is a 5- or 6-membered saturated hetero ring, a 5- or 6-membered single ring and 2 condensed ring aromatic hetero ring.

Specifically, it may, for example, be an acyl group which may be substituted, represented by —$COR_7$, an amino group which may be substituted, represented by —$NR_8R_9$, a carbamate group which may be substituted, represented by —$NHCOOR_{11}$, a carboxylate group which may be substituted, represented by —$COOR_{12}$, an acyloxy group which may be substituted, represented by —$OCOR_{13}$, a carbamoyl group which may be substituted, represented by —$CONR_{14}R_{15}$, a sulfonyl group which may be substituted, represented by —$SO_2R_{16}$, a sulfamoyl group which may be substituted, represented by —$SO_2NR_{17}R_{18}$, a sulfonate group which may be substituted, represented by —$SO_3R_{19}$, or a sulfone amide group which may be substituted, represented by —$NHSO_2R_{20}$.

Preferred specific examples of the acyl group (—$COR_7$):

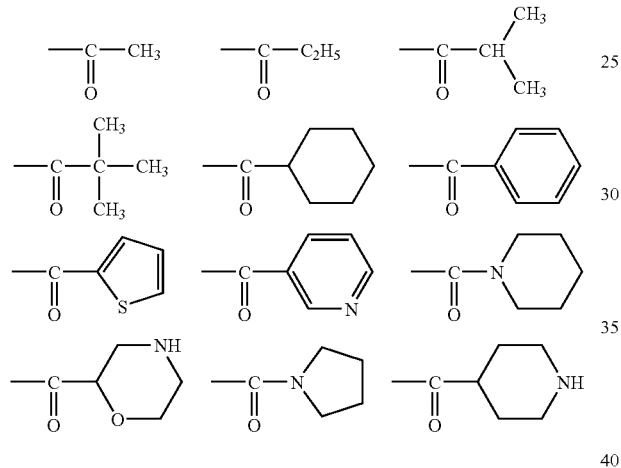

Preferred specific examples of the amino group (—$NR_8R_9$):

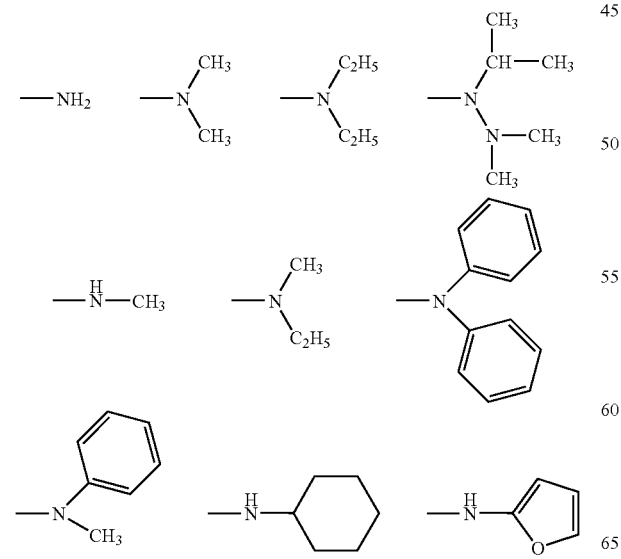

Preferred specific examples of the acylamino group (—$NHCOR_{10}$):

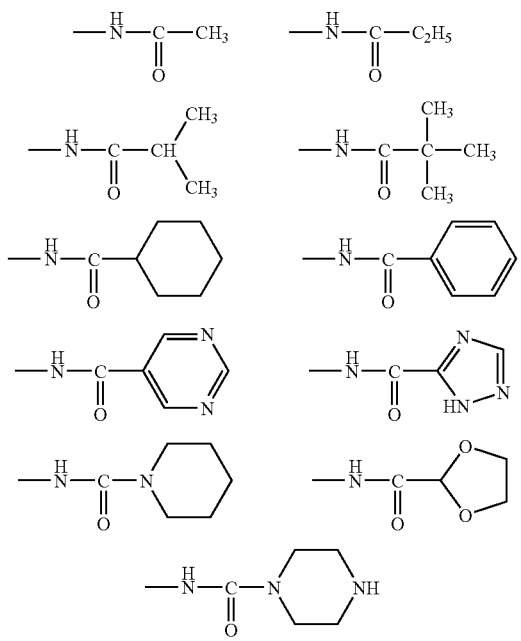

Preferred specific examples of the carbamate group (—$NHCOOR_{11}$):

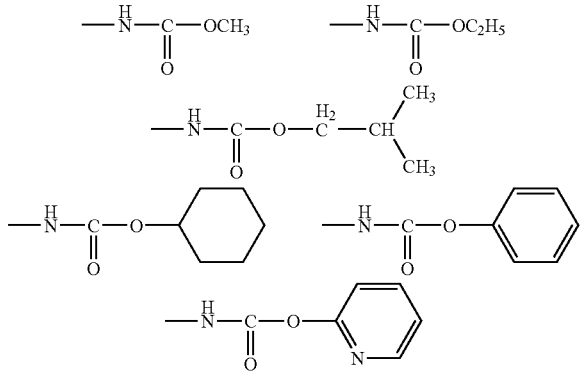

Preferred specific examples of the carboxylate group (—$COOR_{12}$):

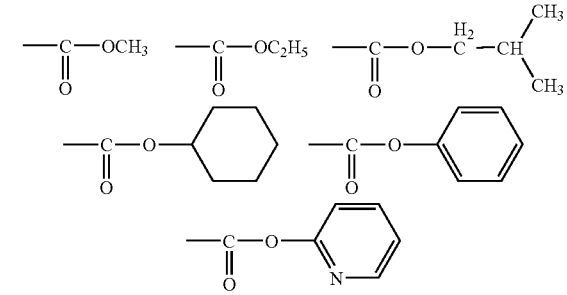

Preferred specific examples of the acyloxy group (—OCOR$_{13}$):
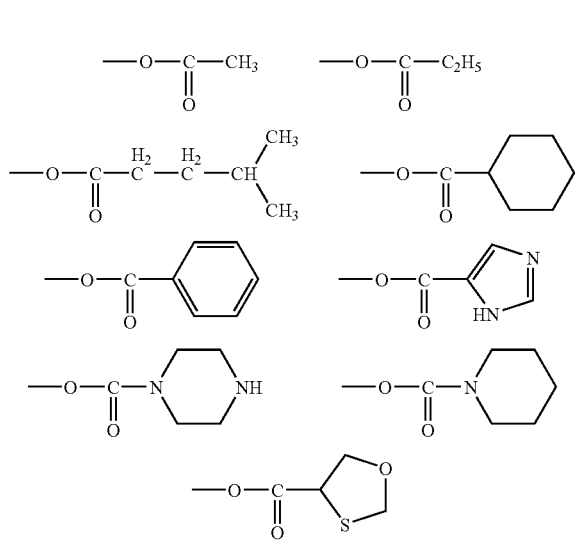
Preferred specific examples of the carbamoyl group (—CONR$_{14}$R$_{15}$):
Preferred specific examples of the sulfonyl group (—SO$_2$R$_{16}$):
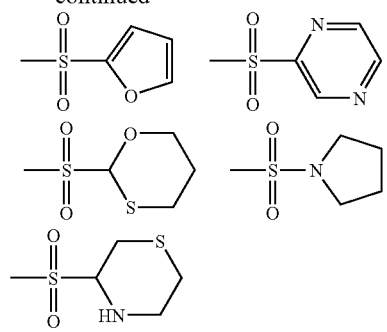
Preferred specific examples of the sulfamoyl group (—SO$_2$NR$_{17}$R$_{18}$):
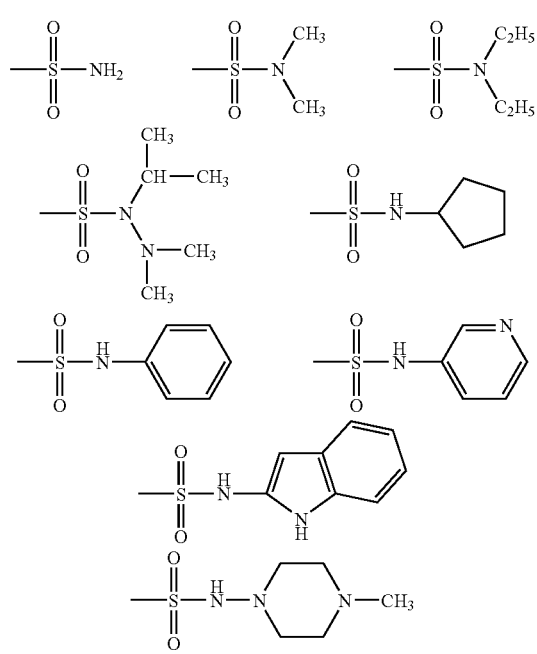
Preferred specific examples of the sulfonate group (—SO$_3$R$_{19}$):
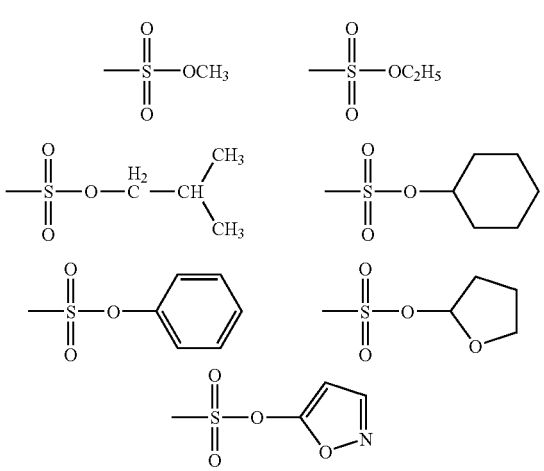

Preferred specific examples of the sulfonamide group (—NHSO$_2$R$_{20}$):

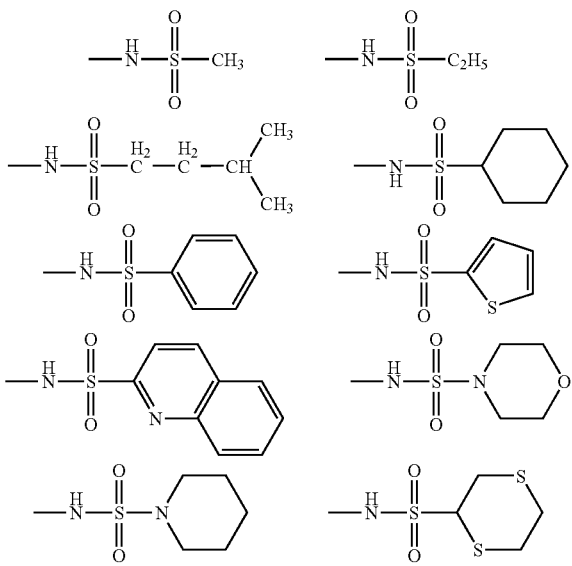

The linear or branched alkyl group, the cyclic alkyl group, the linear or branched alkenyl group, the cyclic alkenyl group, the linear or branched alkoxy group, and the linear or branched alkylthio group, which the above-mentioned ring A or B may have, and the alkyl chain moiety of the alkyl group represented by R$_7$ to R$_{20}$, may further have a substituent, and as such a substituent, the following may, for example, be mentioned.

A C$_{1-10}$ alkoxy group such as a methoxy group, an ethoxy group, a n-propoxy group, an isopropoxy group, a n-butoxy group, a sec-butoxy group or a tert-butoxy group; a C$_{2-12}$ alkoxyalkoxy group such as a methoxymethoxy group, an ethoxymethoxy group, a propoxymethoxy group, an ethoxyethoxy group, a propoxyethoxy group or a methoxybutoxy group; a C$_{3-15}$ alkoxyalkoxyalkoxy group such as a methoxymethoxymethoxy group, a methoxymethoxyethoxy group, a methoxyethoxymethoxy group, a methoxymethoxyethoxy group or an ethoxyethoxymethoxy group; a C$_{6-12}$ aryl group such as a phenyl group, a tolyl group or a xylyl group (which may further be substituted by an optional substituent); a C$_{6-12}$ aryloxy group such as a phenoxy group, a tolyloxy group, a xylyloxy group or a naphthyloxy group; and a C$_{2-12}$ alkenyloxy group such as an allyloxy group or a vinyloxy group, may, for example, be mentioned.

Further, other substituents may, for example, be a hetero cyclic group such as a 2-thienyl group, a 2-pyridyl group, a 4-piperidyl group or a morpholino group; a cyano group; a nitro group; a hydroxyl group; an amino group; a C$_{1-10}$ alkylamino group such as an N,N-dimethylamino group or an N,N-diethylamino group; a C$_{1-6}$ alkylsulfonylamino group such as a methylsulfonylamino group, an ethylsulfonylamino group or a n-propylsulfonylamino group; a halogen atom such as a fluorine atom, a chlorine atom or a bromine atom; a C$_{2-7}$ alkoxycarbonyl group such as a carboxyl group, a methoxycarbonyl group, an ethoxycarbonyl group, a n-propoxycarbonyl group, an isopropoxycarbonyl group or a butoxycarbonyl group; a C$_{2-7}$ alkylcarbonyloxy group such as methylcarbonyloxy group, an ethylcarbonyloxy group, a n-propylcarbonyloxy group, an isopropylcarbonyloxy group or a n-butylcarbonyloxy group; and a C$_{2-7}$ alkoxycarbonyloxy group such as a methoxycarbonyloxy group, an ethoxycarbonyloxy group, a n-propoxycarbonyloxy group, an isopropoxycarbonyloxy group or a n-butoxycarbonyloxy group.

The substituents which the above ring A or B may have, may be bonded to each other to form a fused ring. The fused ring formed by such substituents, may be a saturated or unsaturated hydrocarbon ring or a saturated or unsaturated hetero ring which contains one or plural hetero atoms. The numbers of members constituting the ring structure is not particularly limited, but with respect to both the hydrocarbon ring and the hetero ring, preferred is a 5- to 7-membered ring, particularly preferred is a 5- or 6-membered ring.

Further, R$_8$ and R$_9$, R$_{14}$ and R$_{15}$, or R$_{17}$ and R$_{18}$, may be bonded to each other to form a fused ring structure. The fused ring to be formed by them, may be a saturated or unsaturated hydrocarbon ring or a saturated or unsaturated hetero ring which contains one or plural hetero atoms. The number of members constituting the ring structure is not limited, but with respect to both the hydrocarbon ring and the hetero ring, preferred is a 5- to 7-membered ring, and particularly preferred is a 5- or 6-membered ring.

Preferred examples of such fused ring structure will be shown below.

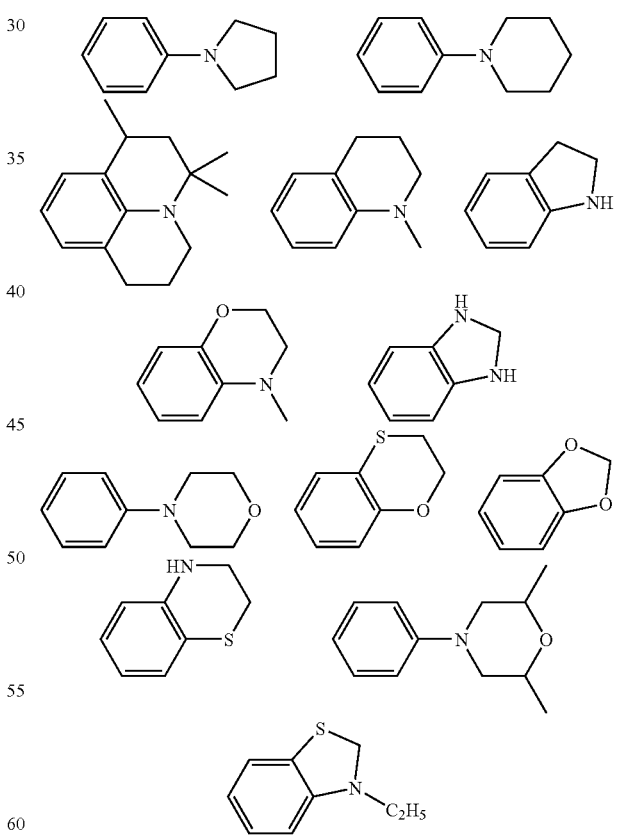

With respect to their positions for condensation, the positions and number are not particularly limited, so long as they are between the adjacent substituents. Further, such fused ring may have substituents similar to those which ring A or B may have.

Now, a more preferred structure of the compound represented by the above formula (1) in the present invention, will be described.

Among the above-mentioned substituents which the aromatic ring represented by ring A or B may have, the following may be mentioned as more preferred substituents. A $C_{1-18}$ linear or branched alkyl group, which may be substituted, such as a methyl group, an ethyl group, a propyl group, an isopropyl group, a n-butyl group, a sec-butyl group, a tert-butyl group or a n-heptyl group; a $C_{1-18}$ linear or branched alkoxy group, which may be substituted, such as a methoxy group, an ethoxy group, a n-propoxy group, an isopropoxy group, a n-butoxy group, a sec-butoxy group or a tert-butoxy group; a $C_{1-18}$ linear or branched alkylthio group which may be substituted, such as a methylthio group, an ethylthio group, a n-propylthio group, a n-butylthio group, a sec-butylthio group or a tert-butylthio group; a halogen atom such as a fluorine atom, a chlorine atom or a bromine atom; a nitro group; a cyano group; a mercapto group; a hydroxyl group; an amino group represented by —$NR_8R_9$; an acylamino group represented by —$NHCOR_{10}$; a carbamate group represented by —$NHCOOR_{11}$; a carboxylate group represented by —$COOR_{12}$; an acyloxy group represented by —$OCOR_{13}$; a carbamoyl group represented by —$CONR_{14}R_{15}$; and a saturated heterocyclic group formed by bonding of adjacent substituents to each other for condensation.

Among them, a particularly preferred substituent may, for example, be a $C_{1-18}$ linear or branched alkyl group which may be substituted, such as a methyl group, an ethyl group, a propyl group, an isopropyl group, a n-butyl group, a sec-butyl group, a tert-butyl group or a n-heptyl group; a $C_{1-18}$ linear or branched alkoxy group which may be substituted, such as a methoxy group, an ethoxy group, a n-propoxy group, an isopropoxy group, a n-butoxy group, a sec-butoxy group or a tert-butoxy group; a $C_{1-18}$ linear or branched alkylthio group which may be substituted, such as a methylthio group, an ethylthio group, a n-propylthio group, a n-butylthio group, a sec-butylthio group or a tert-butylthio group; a mercapto group; a hydroxyl group; an amino group represented by —$NR_8R_9$; an acylamino group represented by —$NHCOR_{10}$; or a saturated heterocyclic group formed by bonding of adjacent substituents to each other for condensation.

With respect to the bonding position of a substituent, in a case where ring A or B is a benzene ring, the substituent is preferably located at a p-position to the unsaturated bond. Further, in a case where ring A or B is a 5-membered hetero ring, the unsaturated bond and the substituent are preferably bonded at the 2-position and/or the 5-position.

In the present invention, the following may be mentioned as preferred examples of the compound represented by the above formula (1):

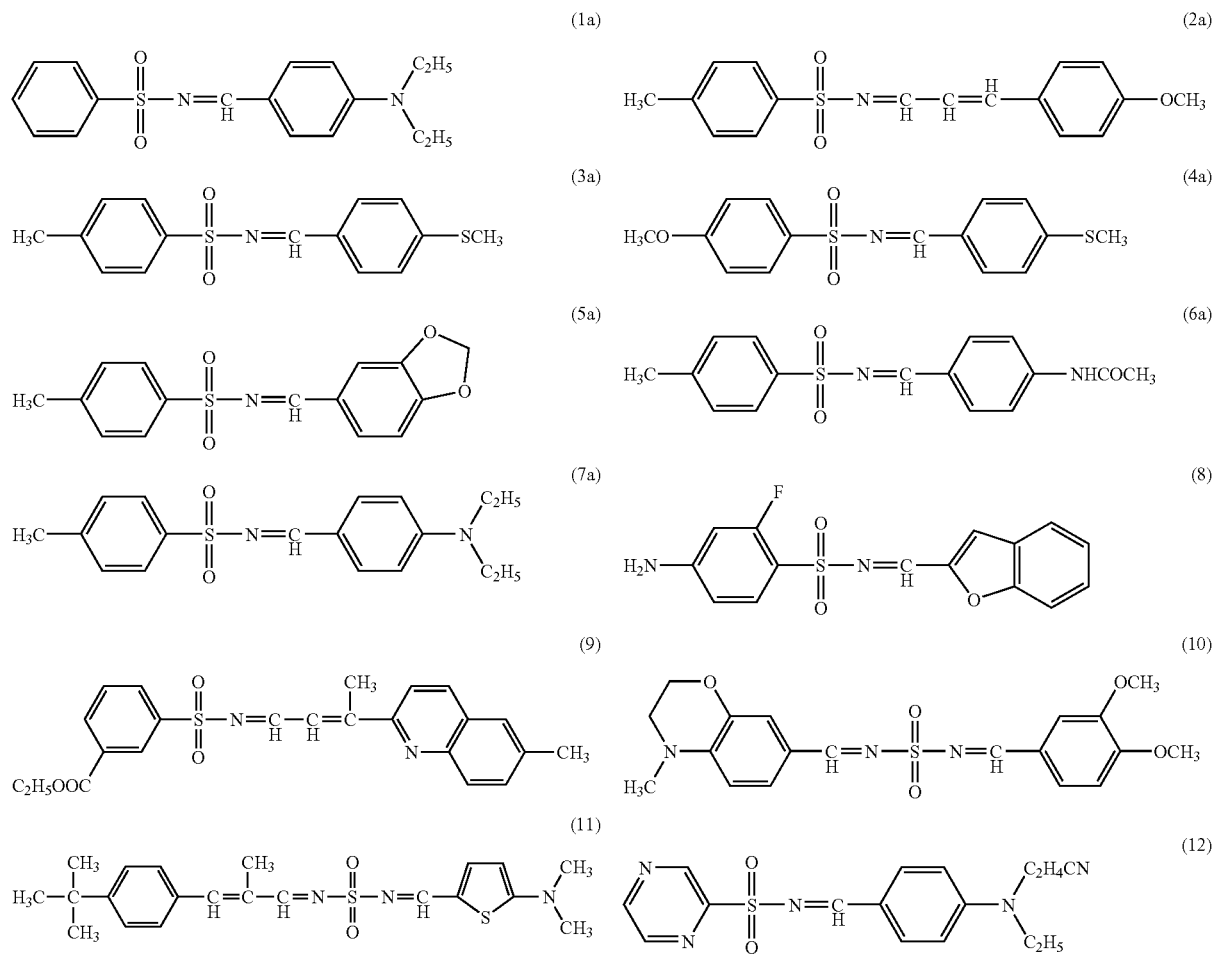

-continued
(13)
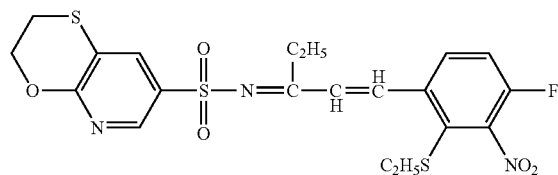
(14)
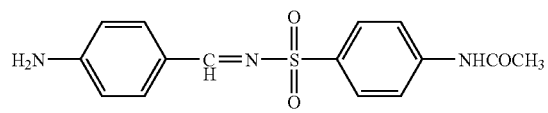
(15)
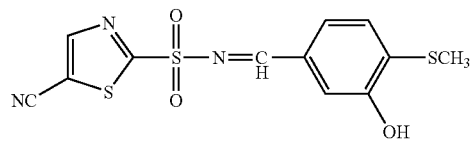
(16)
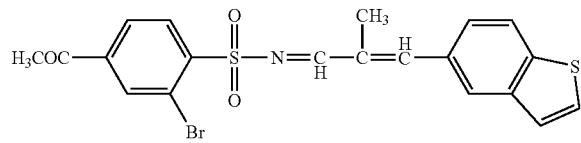
(17)
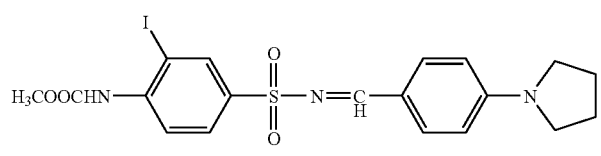
(18)
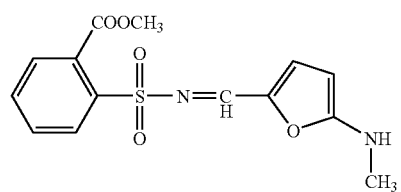
(19)
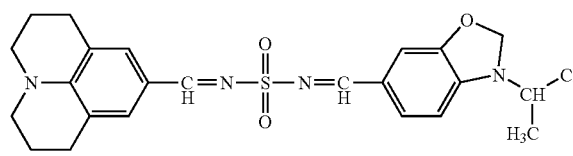
(20)
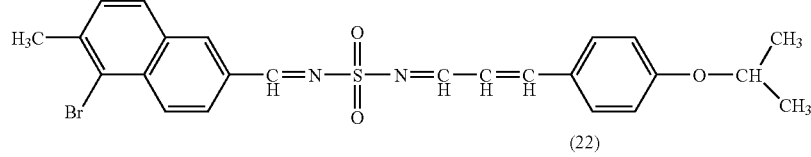
(21)
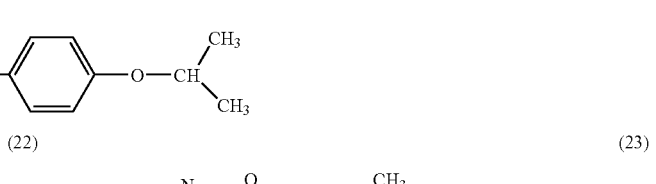
(22)
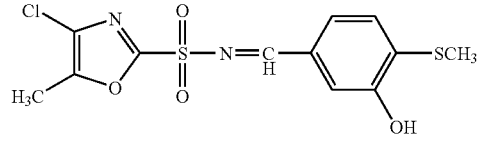
(23)
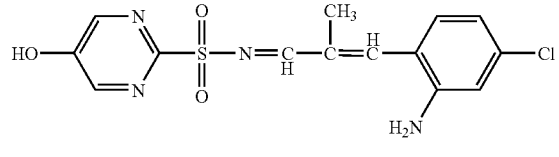
(24)
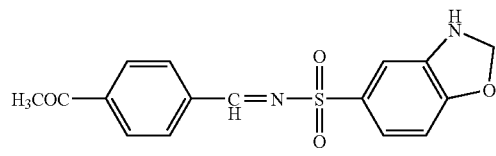
(25)
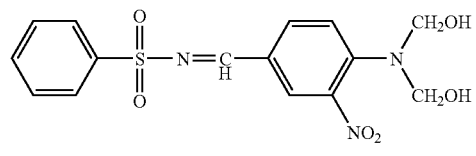
(26)
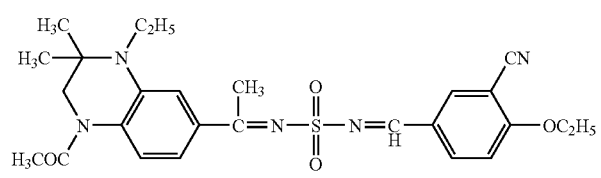
(27)
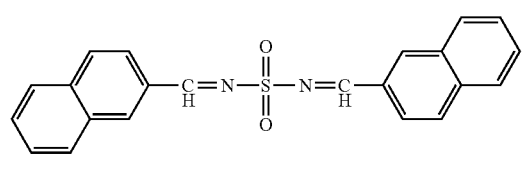
(28)
(29)

-continued
(30) 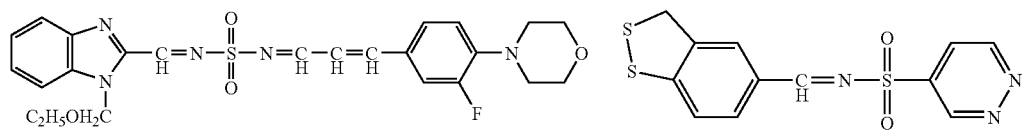
(31) 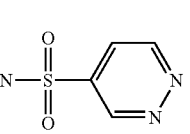
(32) 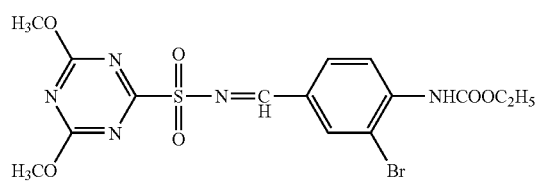
(33) 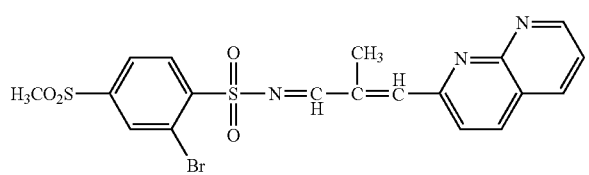
(34) 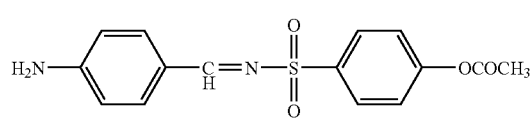
(35) 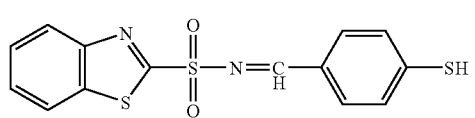
(36) 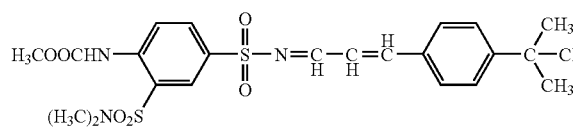
(37) 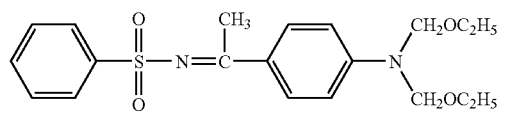
(38) 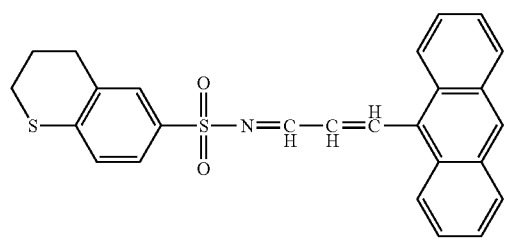
(39) 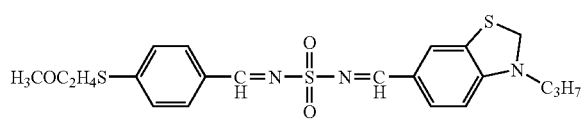
(40) 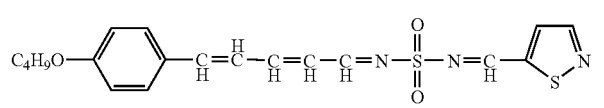
(41) 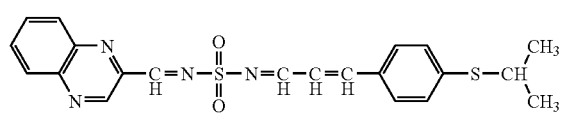
(42) 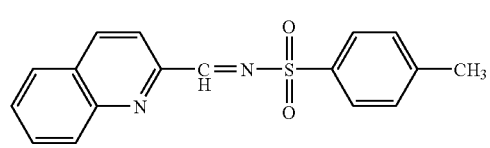
(43) 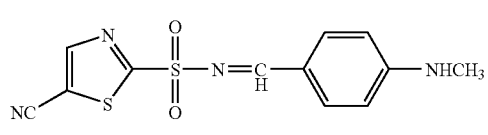
(44) 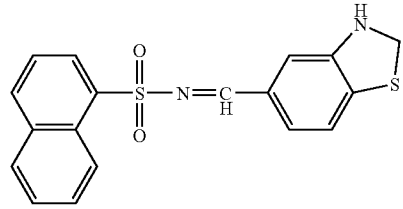
(45) 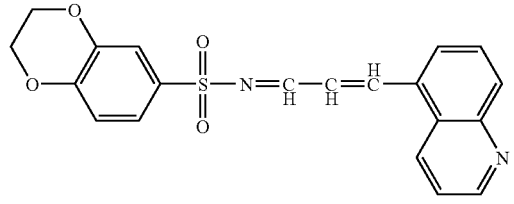
(46) 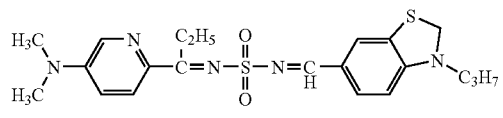
(47) 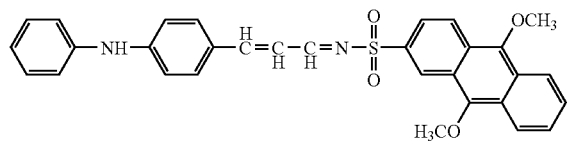

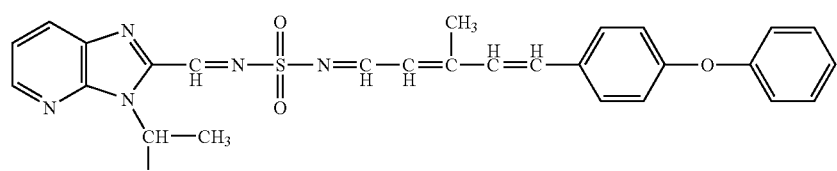
(48)

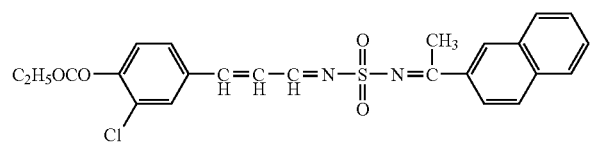
(49) (50)

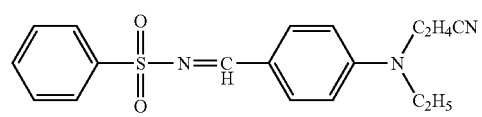
(51) (52)

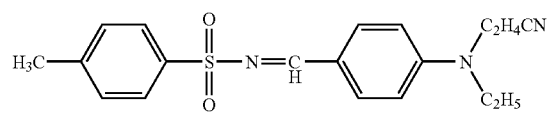
(53) (54)

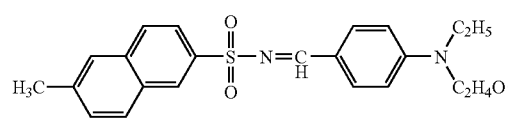
(55) (56)

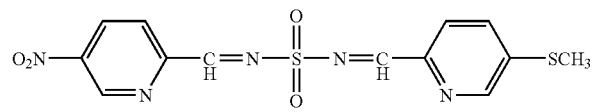
(57) (58)

The compound represented by the above formula (1) has optical characteristics excellent for recording and reading information by means of a blue semiconductor laser, such that the maximum absorption wavelength (λmax) when formed into a thin film, is in a relatively short wavelength region of from about 320 to 400 nm in many cases, the peak of the absorption spectrum is relatively sharp, and the molar absorption coefficient ε is at least 20000. Here, the maximum absorption wavelength is usually meant for the maximum absorption wavelength at a wavelength of at least 300 nm. Further, it is excellent also in a thin film forming property in a state where it is dissolved or dispersed in a solvent, and accordingly, it also satisfies the chemical characteristics required for the production of an optical recording medium. Accordingly, the compound represented by the formula (1) can be very advantageously be used for a recording layer for an optical recording medium for recording and reading by means of a blue semiconductor laser.

Further, the compound to be used for a recording layer of an optical recording medium of the present invention more preferably satisfies that the optical density OD in a solution state is at least 80, the solubility in a non-hazardous and inexpensive solvent which is commonly used, is high, a film of good quality can be formed when a thin film is to be formed (no crystallization takes place at the time of film formation), and the storage stability is good in a solution state and in a thin film state.

Further, with the recording layer of the optical recording medium of the present invention, the extinction coefficient (imaginary part of complex index of refraction) k at the wavelength of recording and reading light is preferably from 0.02 to 0.3, particularly preferably from 0.05 to 0.25. Further, the refractive index (real part of complex index of refraction) n is preferably at least 1.8, particularly preferably at least 2.0.

Now, the optical recording medium of the present invention will be described.

The optical recording medium of the present invention comprises at least a substrate and a recording layer containing the compound represented by the above formula (1). Further, an undercoat layer, a reflective layer or a protective layer may, for example, be provided, as the case requires.

As an example of a preferred layered structure, a medium having high reflectance may be mentioned in which a recording layer is formed on a substrate, and a reflective layer and a protective layer are further laminated thereon in this order. In such a case, a laser beam will be irradiated from the substrate side to carry out recording and reading of information (medium structural example 1).

Now, the optical recording medium of the present invention will be described with reference to medium having such a structure (medium structural example 1) as an example. In the following description, for the convenience of the description, the side where the protective layer is present and the side where the substrate is present, at the time of lamination, will be regarded as the upper and lower directions, and the respective surfaces of each layer corresponding to these directions will be referred to as the upper and lower surfaces of each layer, respectively.

As the substrate in the optical recording medium of the present invention, those made of various materials may basically be used so long as they are transparent materials at the wavelengths of the recording light and the reading light. Specifically, a substrate made of a resin such as an acrylic resin, a methacrylic resin, a polycarbonate resin, a polyolefin resin (particularly non-crystalline polyolefin), a polyester resin, a polystyrene resin or an epoxy resin, a substrate made of glass, or a substrate having a resin layer made of a radiation-curable resin such as a photocurable resin, formed on glass, may, for example, be mentioned.

Among them, from the viewpoint of high productivity, costs, moisture absorption resistance, etc., a substrate made of an injection-molded polycarbonate is preferred. From the viewpoint of chemical resistance, moisture absorption resistance, etc., a substrate made of a non-crystalline polyolefin is preferred. Further, from the viewpoint of the high speed response, etc., a substrate made of glass is preferred. In a case where a substrate made of a resin is used or where a substrate having a resin layer formed on the side (the upper side) which is in contact with the recording layer, is used, a guide groove or pit for a recording or reading light, may be formed on the upper side of such a resin substrate or resin layer. The shape of the guide groove may, for example, be a concentric circular shape or spiral shape, based on the center of the optical recording medium. In the case of forming a spiral guide groove, the groove pitch is preferably at a level of from 0.2 to 1.2 μm.

A recording layer containing a compound represented by the above formula (1) is formed directly on the upper side of the substrate or on the upper side of an undercoating layer or the like formed on the substrate, as the case requires. As the film forming method for the recording layer, various thin film forming methods which are commonly employed may be mentioned, such as, a vacuum vapor deposition method, a sputtering method, a doctor blade method, a casting method, a spin coating method and a dipping method. From the viewpoint of the mass production and costs, a spin coating method is preferred, and from such a viewpoint that a recording layer having a uniform thickness is obtainable, a vacuum vapor deposition method or the like is preferred to the coating method. In the case of film forming by means of a spin coating method, the rotational speed is preferably from 500 to 15000 rpm. Further, in some cases, after the spin coating, treatment such as heating or applying a solvent vapor, may be carried out.

In a case where a recording layer is formed by a coating method such as a doctor blade method, a casting method, a spin coating method or a dipping method, the solvent for coating wherein the compound represented by the above formula (1) is dissolved to be coated on the substrate, is not particularly limited so long as it is a solvent which does not erode the substrate. Specifically, it may, for example, be a ketone alcohol solvent such as diacetone alcohol or 3-hydroxy-3-methyl-2-butanone; a cellosolve solvent such as methyl cellosolve or ethyl cellosolve; a chain hydrocarbon solvent such as n-hexane or n-octane; a cyclic hydrocarbon solvent such as cyclohexane, methylcyclohexane, ethylcyclohexane, dimethylcyclohexane, n-butylcyclohexane, tert-butylcyclohexane or cyclooctane; a perfluoroalkyl alcohol solvent such as tetrafluoropropanol, octafluoropentanol or hexafluorobutanol; or a hydroxycarboxylate solvent such as methyl lactate, ethyl lactate or methyl 2-hydroxyisobutyrate.

In a case where the vacuum vapor deposition is employed, for example, the compound represented by the above formula (1) and, as the case requires, other components for the recording layer, such as dyes or various additives, may be put into a crucible set in a vacuum chamber, then this vacuum chamber is evacuated by a suitable vacuum pump to a level of from $10^{-2}$ to $10^{-5}$ Pa, whereupon the crucible is heated to vaporize the components for the recording layer and to have them vapor-deposited on a substrate disposed to face the crucible, thereby to form a recording layer.

Further, to the recording layer, in addition to the compound represented by the above formula (1) a transition metal chelate compound (such as acetyl acetonate chelate, bisphenyl dithiol, salicylaldehyde oxime or bisdithio-α-diketone) or the like may be incorporated as a singlet oxygen quencher in order to improve the stability or light resistance, or a recording sensitivity-improving agent such as a metal compound may be incorporated in order to improve the recording sensitivity. Here, the metal compound is meant for one wherein a metal such as a transition metal is contained in a compound in the form of an atom, an ion or a cluster, and it may, for example, be an organic metal compound such as an ethylenediamine complex, an azomethine complex, a phenylhydroxyamine complex, a phenanthroline complex, a dihydroxyazobenzene complex, a dioxime complex, a nitrosoaminophenol complex, a pyridyltriazine complex, an acetylacetonate complex, a metallocene complex or a porphyrin complex. The metal atom is not particularly limited, but it is preferably a transition metal.

Further, in the recording layer, a plurality of compounds represented by the above formula (1) may be used in combination, as the case requires.

Further, to the recording layer, in addition to the compound represented by the above formula (1), another type of a dye may be used in combination, as the case requires. Such another type of a dye is not particularly limited so long as it is one which mainly has a proper absorption in an oscillation wavelength region of the recording laser. Further, it is possible to produce an optical recording medium which is capable of recording or reading by means of a plurality of laser beams belonging to different wavelength zones, by incorporating a dye suitable for recording and reading by means of a near infrared laser having an oscillation wavelength in a wavelength zone of from 770 to 830 nm, which is used for e.g. CD-R, or a dye suitable for recording and reading by means of a red laser having an oscillation wavelength in a wavelength zone of from 620 to 690 nm, which is used for e.g. DVD-R, in the recording layer in combination with the compound represented by the above formula (1).

Such another type of a dye other than the compound represented by the above formula (1), may, for example, be a metal-containing azo dye, a benzophenone dye, a phthalocyanine dye, a naphthalocyanine dye, a cyanine dye, an azo dye, a squarylium dye, a metal-containing indoaniline dye, a triarylmethane dye, a merocyanine dye, an azulenium dye, a naphthoquinone dye, an anthraquinone dye, an indophenol dye, a xanthene dye, an oxazine dye or a pyrylium dye.

Further, it is also possible to use a binder, a leveling agent, a defoaming agent, etc., as the case requires. As a preferred binder, a polyvinyl alcohol, a polyvinyl pyrrolidone, a nitrocellulose, cellulose acetate, a ketone resin, an acrylic resin, a polystyrene resin, a urethane resin, a polyvinyl butyral, a polycarbonate or a polyolefin may, for example, be mentioned.

The thickness of the recording layer is not particularly limited, since the suitable thickness may vary depending upon the recording method, etc. However, in order to make recording possible, a thickness of a certain degree is required, and it is usually at least 1 nm, preferably at least 5 nm. However, if it is too thick, recording can not be properly carried out, and it is usually at most 300 nm, preferably at most 200 nm, more preferably at most 100 nm.

On the recording layer, a reflective layer is formed. Its thickness is preferably from 50 to 300 nm, particularly preferably from 100 to 250 nm.

As the material for the reflective layer, a material having a sufficiently high reflectance at the wavelength of the reading light, for example, a metal such as Au, Al, Ag, Cu, Ti, Cr, Ni, Pt, Ta or Pd, may be used alone or in the form of an alloy. Among them, Au, Al or Ag is suitable as a material for the reflective layer, as the reflectance is high. Further, using such a metal as the main component, other materials may be added and incorporated. Here, the main component means one having a content of at least 50%. Materials other than the main component may, for example, be a metal and a semi metal, such as Mg, Se, Hf, V, Nb, Ru, W, Mn, Re, Fe, Co, Rh, Ir, Cu, Zn, Cd, Ga, In, Si, Ge, Te, Pb, Po, Sn, Bi, Ta, Ti, Pt, Pd and Nd. Among them, one containing Ag as the main component is particularly preferred from such a viewpoint that the cost is low, a high reflectance can easily be obtained, and when the after-mentioned print-receiving layer is provided, one having a white and beautiful ground color, is obtainable. For example, an alloy having from about 0.1 to 5 atomic % of at least one member selected from Au, Pd, Pt, Cu and Nd incorporated to Ag, is preferred from the viewpoint of the high reflectance, high durability, high sensitivity and low cost. Specifically, it may, for example, be a AgPdCu alloy, a AgCuAu alloy, a AgCuAuNd alloy or a AgCuNd alloy. As a material other than a metal, it is also possible to alternately laminating a low refractive index thin film and a high refractive index thin film to form a multi-layered film, which will be used as a reflective layer.

As a method for forming a reflective layer, a sputtering method, an ion plating method, a chemical vapor deposition method or a vacuum vapor deposition method may, for example, be mentioned. Further, it is also possible to form a known inorganic or organic interlayer or adhesive layer on the substrate or under the reflective layer, in order to improve the reflectance, improve the recording characteristics or improve the adhesive property.

The material for the protective layer to be formed on the reflective layer is not particularly limited so long as it is one to protect the reflective layer from an external force. As a material of an organic substance, a thermoplastic resin, a thermosetting resin, an electron beam-curable resin, an UV-curable resin may, for example, be mentioned. Further, as an inorganic substance, silicon oxide, silicon nitride, $MgF_2$ or $SnO_2$ may, for example, be mentioned.

In a case where a thermoplastic resin or a thermosetting resin is, for example, used, a protective layer may be formed by dissolving it in a suitable solvent to form a coating liquid, which is coated and dried on the reflective layer. In a case where an UV curable resin is used, it may be coated on the reflective layer as it is, or a coating liquid prepared by dissolving it in a suitable solvent, may be coated on the reflective layer, followed by curing by irradiation with UV light, to form a protective layer. As such an UV curable resin, an acrylate resin such as urethane acrylate, epoxy acrylate or polyester acrylate, may, for example, be used. These materials may be used alone or in combination as a mixture of a plurality of them. Further, the protective layer may be formed in the form of a single layer or multilayers.

As the method for forming the protective layer, a coating method such as a spin coating method or a casting method, or a method such as a sputtering method or a chemical vapor deposition method, may be employed in the same manner as for the recording layer. Among them, a spin coating method is preferred. The thickness of the protective layer is usually at least 0.1 μm, preferably at least 3 μm, since a certain thickness is required to provide the protecting function. However, if it is too thick, not only no further effects will be obtained, but also it takes time to form the protective layer, or the cost tends to increase. Accordingly, it is usually at most 100 μm preferably at most 30 μm.

In the foregoing, the layered structure of the optical recording medium has been described with reference to the structure in which a substrate, a recording layer, a reflective layer and a protective layer are laminated in this order, as an example. However, as mentioned above, other layer structures may be adopted.

For example, on the upper surface of the protective layer in the layered structure of the above example, or on the upper surface of the reflective layer by omitting the protective layer from the layered structure in the above example, another substrate may further be bonded. The substrate in such a case may be a substrate itself having no layer formed thereon, or one having an optional layer such as a reflective layer on the bonding surface or the opposite surface. Further, two sheets of the recording medium having the layered structure of the above example or the optical recording medium having the protective layer omitted from the layered structure of the above example, may be bonded to each other so that the upper surfaces of the respective protective layers and/or reflective layers face to each other. Further, between the substrate and the recording layer, a layer made of a single substance of metal such as Si, Zn, Ag, Al, Ti, Sn, W, Cu, Ge, Mn, Sb or Zr or a compound thereof (such as an oxide, nitride or sulfide) may be formed. By forming such a layer, improvement of the light resistance of the optical recording medium can be expected. Particularly, it is preferred to provide a layer containing $SiO_2$, $Al_2O_3$ and/or ZnS, as it is particularly preferred to provide a layer containing ZnS and $SiO_2$.

Further, as an example of a preferred layered structure of an optical recording medium of the present invention, a medium may be mentioned wherein a reflective layer is formed on a substrate, and a recording layer and a protective coating film are laminated thereon in this order. In such a case, a laser beam is irradiated through the protective coating film to carry out recording and reading of information (medium structural example 2).

Such a protective coating film may be formed by bonding a film or sheet material by an adhesive, or by using the same material as for the above-mentioned protective layer and coating a film-forming coating liquid, followed by curing or drying. The thickness of the protective coating film is usually at least 0.1 μm, preferably at least 3 μm, since a thickness of certain degree is required in order to perform the protecting function. However, if it is too thick, not only no additional effects can be obtained, but also it tends to take time to form the protective layer, or costs tend to be high. Accordingly, it is usually at most 300 μm, preferably at most 200 μm.

Also in such a layered structure, the respective layers such as the recording layer and the reflective layer may be the same as in the above-mentioned medium structural example 1. However, in this layered structure, the substrate is not required to be transparent. Accordingly, in addition to the above-mentioned materials, a substrate made of an opaque resin, ceramics or metal (inclusive of an alloy) may be used.

Also in such a layered structure, between the above-mentioned respective layers, an optional layer may be formed as the case requires, so long as the characteristics of the present invention will not be thereby impaired. For example, between the protective layer and the recording layer, a layer made of a simple substance of metal such as Si, zn, Ag, Al, Ti, Sn, W, Cu, Ge, Mn, Sb or Zr, or a compound thereof (such as an oxide, nitride or sulfide) may be formed. By forming such a layer, improvement of the light resistance of the optical recording medium can be expected. Particularly, it is preferred to provide a layer containing $SiO_2$, $Al_2O_3$ and/or ZnS, and it is particularly preferred to provide a layer containing ZnS and $SiO_2$.

As one of means to increase the recording density of an optical recording medium, the numerical aperture of an object lens may be increased. It is thereby possible to microsize the optical spot focused on the information recording surface. However, if the numerical aperture of an object lens is increased, aberration of the optical spot caused by warpage or the like of the optical recording medium tends to be large when irradiated with a laser beam to carry out recording or reading, and there may be a case where good recording or reading signals can not be constantly obtained.

Such aberration tends to be large as the thickness of the protective coating film or the transparent substrate for a laser beam to pass through, is thick. Accordingly, in order to reduce aberration, it is preferred to reduce the thickness of the protective coating film or the substrate as far as possible. However, usually, in order to secure the strength of the optical recording medium, the substrate is required to have a thickness of a certain degree. Accordingly, in such a case, it is preferred to employ the medium structural example 2 (an optical recording medium having a basic layered structure comprising a substrate, a reflective layer, a recording layer and a thin protective coating film). As compared with reducing the thickness of the substrate in the medium structural example 1, it is easy to reduce the thickness of the protective coating film of the medium structural example 2, and it is preferred to employ the medium structural example 2.

However, even with the medium structural example 1 (the optical recording medium having a basic layered structure comprising a transparent substrate, a recording layer, a reflective layer and a protective layer), it becomes possible to use it by reducing the aberration by reducing the thickness of the transparent substrate through which the recording or reading laser beam will pass, to a level of from 50 to 300 μm.

Further, after forming other respective layers, an ultraviolet curable resin layer or an inorganic thin film may, for example, be formed on the incidence surface for the recording or reading laser beam (usually on the lower surface of the substrate) for the purpose of protecting the surface or preventing deposition of dust, etc. On the surface opposite to the incident surface for the recording or reading laser beam (usually the upper surface of the protective layer or the reflective layer), a print receptive layer may be formed, on which printing by various printers such as ink jet printers or thermal transfer printers, or writing by means of various pens or pencils, is possible.

With respect to the laser beam to be used for recording or reading information in the optical recording medium of the present invention, the shorter the wavelength the better from the viewpoint of realizing high density recording. Particularly preferred is a laser beam having a wavelength of from 350 to 530 nm. As a typical example of such a laser beam, a laser beam having a central wavelength of 405 nm, 410 nm or 515 nm may be mentioned.

The above-mentioned laser beam having a wavelength of from 350 to 530 nm may be obtained by using a high power semiconductor laser of a blue color having a wavelength of 405 or 410 nm or a bluish green color having a wavelength of 515 nm. Otherwise, it may also be obtained by subjecting either oscillating laser beam of (a) a continuously oscillating semiconductor laser having a basic oscillation wavelength of from 740 to 960 nm or (b) a continuously oscillating solid laser having a basic oscillation wavelength of from 740 to 960 nm which can be excited by a semiconductor laser, to wavelength change by a second harmonic generator element (SHG).

Such SHG may be any one so long as it is a piezoelectric element lacking in inversion symmetry, but KDP, ADP, BNN, KN, LBO or a compound semiconductor may, for example, be preferred. A specific example for the second harmonic wave may be, in the case of a semiconductor laser having a basic oscillation wavelength of 860 nm, 430 nm as a double wave of the basic oscillation wavelength, or, in the case of a solid laser excited by a semiconductor laser, a double wave of 430 nm from a Cr-doped $LiSrAlF_6$ crystal (the basic oscillation wavelength: 860 nm).

When information is to be recorded on the optical recording medium of the present invention, usually, a laser beam focused to a level of from 0.4 to 0.6 μm will be irradiated to the recording layer (usually from the substrate side through the substrate). The portion of the recording layer irradiated with the laser beam, will absorb the energy of the laser beam and will thereby undergo thermal change such as decomposition, heat generation or melting, whereby the optical characteristics will be changed.

When reading of recorded information is to be carried out, a laser beam having a lower energy is irradiated to the same recording layer (usually from the same direction as in the case of recording). Reading of the information is carried out by reading out the difference between the reflectance at a portion where a change of the optical characteristics has occurred in the recording layer (i.e. a portion where the information has been recorded) and the reflectance at a portion where no change has occurred.

EXAMPLES

Now, the present invention will be described in further detail with reference to Examples. But it should be understood that the present invention is by no means restricted by such specific Examples.

Synthesis of Compound

The synthesis of the compound represented by the above-mentioned formula (1) is not particularly limited, but the following example may be mentioned as a common method.

For example, a compound of the formula (1) wherein l or m is 1, l+m=1, k=0, n=0, and rings A and B are benzene rings, may be obtained by heating benzene sulfonamide and benzaldehyde in toluene in the presence of $BF_3$ catalyst.

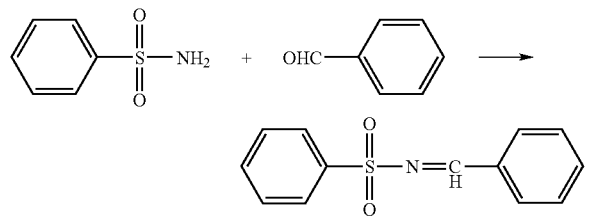

Here, by using cinnamaldehyde instead of benzaldehyde, a compound of the formula (1) wherein k or n=1, can be obtained. Likewise, by changing the aldehyde to be used, various compounds differing in k and n can be synthesized.

Further, by using a sulfamide as described in Tetrahedron Letters, Vol. 37, 16, 2859 as the starting material instead of benzenesulfonamide, it is possible to obtain a compound wherein l=1, m=1 and l+m=2.

Further, by using various benzene ring derivatives or hetero aromatic rings, compounds having various ring structures for rings A and B, as shown in the exemplified compounds, may be synthesized.

Example 1

Preparation of (a) Dye Compound

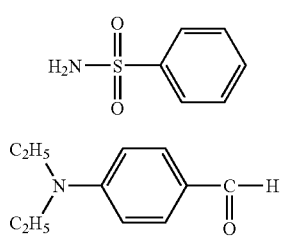

1.57 g (10 mmol) of benzenesulfonamide represented by the above structural formula [I] and 1.95 g (11 mmol) of p-diethylaminobenzaldehyde represented by the above structural formula [II] were added to 35 ml of toluene, and heated and dissolved at 70° C. with stirring. Thereafter, 0.6 g of a boron trifluoride-diethylether complex was dropwise added, followed by refluxing for 3 hours. The reaction solution was cooled, followed by filtration to remove unreacted benzenesulfonamide. 100 ml of water was added to the filtrate, and extraction and washing were carried out, whereupon anhydrous magnesium sulfate was added, and the solution was left to stand overnight. Thereafter, this solution was filtered, and the filtrate was evaporated, whereupon 30 ml of diisopropyl ether was added, followed by stirring and filtration to obtain 0.84 g of a solid represented by the structure of the exemplified compound (1a) (yield: 26.5%).

The results of the measurement of the absorption spectrum of the product in chloroform, are shown in FIG. 1.

The maximum absorption wavelength (λmax) of the exemplified compound (1a) in chloroform was 392.5 nm, and the molar absorption coefficient was $5.5 \times 10^4$.

(b) Preparation of Recording Medium

The exemplified compound (1a) was dissolved in octafluoropentanol and adjusted to 1.0 wt %. This solution was filtered, and the obtained dissolved solution was dropped on an injection molded polycarbonate resin substrate having a diameter of 120 mm and a thickness of 1.2 mm and coated by a spinner method and then dried at 100° C. for 30 minutes.

Figure 2:
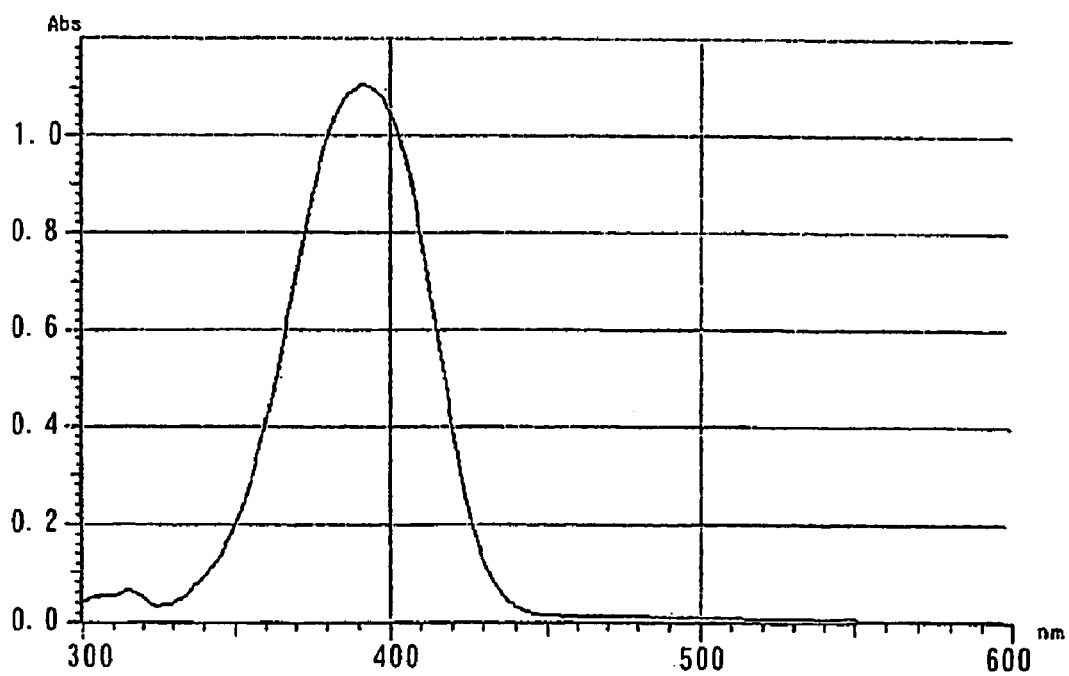
FIG. 2 is an absorption spectrum of a coated film of the compound synthesized in Example 1.

The results of the measurement of the absorption spectrum of this coated film are shown in FIG. 2. The maximum absorption wavelength (λmax) of the coated film of the exemplified compound (1a) was 391 nm.

In the present invention, the absorption spectrum of the coated film is measured by irradiating the coated film with light introduced from the coated film side, by means of an ultraviolet visible spectrophotometer, using air as a reference.

On this coated film, Ag or the like may, for example, be formed into a film by e.g. a sputtering method to form a reflective layer. Then, an ultraviolet curable resin is coated by e.g. a spin coating method, followed by irradiation with ultraviolet rays for curing to form a protective layer, whereby an optical recording medium will be obtained. It is evident that this optical recording medium is capable of recording or reading by means of a semiconductor laser having a central wavelength of 405 nm, from the value of the maximum absorption wavelength (λmax) of the coated film.

Example 2

Preparation of (a) Dye Compound

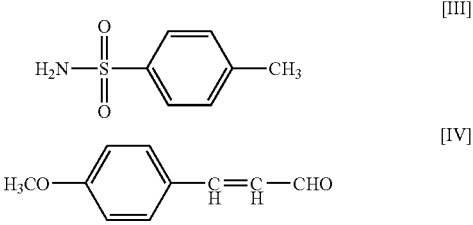

1.71 g (10 mmol) of p-toluenesulfonamide represented by the above structural formula [III] and 1.62 g (10 mmol) of 4-methoxycinnamaldehyde represented by the above structural formula [IV] were added to 40 ml of toluene, and heated and dissolved with stirring at 70° C. Thereafter, 0.6 g of a boron trifluoride-diethylether complex was dropwise added, followed by refluxing for 7 hours. The reaction solution was cooled, followed by filtration to remove unreacted p-toluenesulfonamide. 75 ml of water was added to the filtrate, followed by extraction and washing, whereupon anhydrous magnesium sulfate was added, and the solution was left to stand overnight. Thereafter, this solution was filtered, and the filtrate was distilled off, whereupon 20 ml of diisopropyl ether was added, followed by stirring and filtration to obtain 0.81 g of a solid represented by the structure of the exemplified compound (2a) (yield: 26.6%).

The maximum absorption wavelength (λmax) of the product in chloroform was 353.5 nm, and the molar absorption coefficient was $2.5 \times 10^4$.

(b) Preparation of Recording Medium

The exemplified compound (2a) was dissolved in octafluoropentanol and adjusted to 1.0 wt %. This solution was filtered, and the obtained dissolved solution was dropped on an injection molded polycarbonate resin substrate having a diameter of 120 mm and a thickness of 1.2 mm and coated by a spinner method and then dried at 100° C. for 30 minutes. The maximum absorption wavelength (λmax) of this coated film was 357.5 nm.

On this coated film, Ag or the like may, for example, be formed into a film by e.g. a sputtering method to form a reflective layer. Then, an ultraviolet curable resin may be coated by e.g. a spin coating method, followed by irradiation with ultraviolet rays for curing to form a protective layer, whereby an optical recording medium can be obtained. It is evident that this optical recording medium is capable of recording or reading by means of a semiconductor laser having a central wavelength of 405 nm, from the value of the maximum absorption wavelength (λmax) of the coated film.

Examples 3 to 9

Using the above preparation method or other methods, each of the illustrated compounds (3a) to (52) was prepared, and then, in the same manner as in Example 1, a coating film was formed.

The maximum absorption wavelength (λmax) and the molar absorption coefficient of such a compound in its solution, and the maximum absorption wavelength (λmax) in the form of a coated film, are shown in Table 1 together with the results of Examples 1 and 2.

On such a coated film, Ag or the like may, for example, be formed into a film by e.g. a sputtering method to form a reflective layer. Then, an ultraviolet curable resin is coated by a spin coating method, followed by irradiation with ultraviolet rays for curing to form a protective layer, whereby an optical recording medium can be obtained. It is evident that such an optical recording medium is capable of recording or reading by means of a semiconductor laser having a central wavelength of 405 nm, from the value of the maximum absorption wavelength (λmax) of the coated film.

Example 10

(a) Preparation of Organic Dye

Using the above preparation method or other methods, the illustrated compound (53) was prepared from p-toluenesulfonamide and N-ethyl-N-(2-cyanoethyl)benzaldehyde. The maximum absorption wavelength (λmax) of the product in chloroform was 373.5 nm, and the molar absorption coefficient was $4.7 \times 10^4$.

(b) Preparation of Recording Medium

The exemplified compound (53) was dissolved in octafluoropentanol and adjusted to 1.0 wt %. This solution was filtered, and the obtained dissolved solution was dropped on an injection molded polycarbonate resin substrate having a diameter of 120 mm and a thickness of 1.2 mm and coated by a spinner method and then dried at 100° C. for 30 minutes. The maximum absorption wavelength (λmax) of this coated film was 380.5 nm. The results are shown in Table 1.

(c) Preparation Example 1 for Optical Recording Medium

Using a Ni stamper, polycarbonate was injection-molded to obtain a first substrate having a diameter of 120 mm and a thickness of 0.6 mm and having a groove formed to have a groove pitch of 425 nm, a groove width of 200 nm and a groove depth of 90 nm. Then, a 0.4% octafluoropentanol solution of the exemplified compound (53) was coated on the substrate by a spin coating method and subjected to heat treatment at 100° C. for 30 minutes to form a dye recording layer having a thickness of about 60 nm. Then, a Ag alloy containing 97 atomic % of Ag, was sputtered to form a reflective layer having a thickness of about 100 nm.

Then, on this reflective layer, an adhesive made of an ultraviolet curable resin was coated, and a preliminarily prepared second substrate made of polycarbonate and having a diameter of 120 mm and a thickness of 0.6 mm, was placed thereon. Then, ultraviolet rays were irradiated from the second substrate side to cure the adhesive thereby to obtain an optical recording medium.

To this recording layer, light was introduced from the first substrate side to carry out recording and reading of information. For the recording and reading, an optical system having a wavelength of 405 nm and NA of 0.65 was used. With respect to the recording conditions, a mark length of 8T=690 nm was recorded by a recording power of 11 mW at a linear velocity of 5.7 m/s. Thereafter, the same information data was read out under irradiation with a laser beam having a reading intensity of 0.2 mW. C/N as an index of the ratio of the signal intensity to noise at that time, was measured and found to be 34 dB. From this result, it is evident that the dye (53) is useful for an optical recording medium employing a short wavelength. Here, this C/N can be more improved by further optimizing various conditions such as the recording strategy, the dye film thickness, etc.

(d) Preparation Example 2 for Optical Recording Medium

An injection molded polycarbonate substrate (a first substrate) having a diameter of 120 mm and a thickness of 0.6 mm and having a groove formed to have a groove pitch of 400 nm, a groove width of 163 nm and a groove depth of about 90 nm, was prepared. On this substrate, a sputtered layer having a thickness of about 20 nm made of a mixture of ZnS and $SiO_2$, was formed. On this sputtered layer on the substrate, a 0.8 wt % octafluoropentanol solution of the exemplified compound (53) was coated by a spin coat method and subjected to heat treatment at 100° C. for 30 minutes to form a recording layer. Then, on this recording layer, a silver alloy was sputtered to form a reflective layer having a thickness of about 250 nm.

Then, on this reflective layer, an adhesive made of an ultraviolet curable resin was coated, and a preliminarily prepared polycarbonate substrate (a second substrate) having a diameter of 120 nm and a thickness of 0.6 mm, was placed thereon, followed by irradiation with ultraviolet rays from the second substrate side to cure the adhesive thereby to obtain an optical recording medium for evaluation.

To this recording layer, light was introduced from the first substrate side to carry out recording and reading of information. For the recording and reading, an optical system having a wavelength of 405 nm and NA of 0.65 was used. For the recording, a single frequency signal of 8T mark/8T space was recorded in the groove with 11 mW at a recording linear velocity of 5.7 m/sec. Here, T is a standard clock period corresponding to a frequency of 66 mHz. Thereafter, the same information data was read out under irradiation with a laser beam having a reading light intensity of 0.3 mW. C/N as an index of the ratio of the signal intensity to noise at that time was measured and found to be 47.5 dB.

From this result, it is evident that the dye (53) is useful for an optical recording medium employing a short wavelength. Further, this C/N can be further improved by further optimizing various conditions such as the recording strategy, the dye film thickness, etc.

TABLE 1

| Exemplified compound No. | Maximum absorption wavelength in solution (solvent used) | Molar absorption coefficient (×10000) | Solvent for coating | Maximum absorption wavelength of coated film |
|---|---|---|---|---|
| (1a) | 392.5 nm (chloroform) | 5.5 | Octafluoro-pentanol | 391 nm |
| (2a) | 353 nm (chloroform) | 3 | Octafluoro-pentanol | 357.5 nm |
| (3a) | 347.5 nm (chloroform) | 3.1 | Octafluoro-pentanol | 348 nm |
| (4a) | 345.5 nm (chloroform) | 2.1 | Octafluoro-pentanol | 347.5 nm |
| (5a) | 337 nm (chloroform) | 1.9 | Octafluoro-pentanol | 340.5 nm |
| (6a) | 323 nm (chloroform) | 3 | Octafluoro-pentanol | 329.5 nm |
| (7a) | 389 nm (chloroform) | 5.5 | Octafluoro-pentanol | 389 nm |
| (51) | 374.5 nm (chloroform) | 4.8 | Octafluoro-pentanol | 381 nm |
| (52) | 371 nm (chloroform) | 4.6 | Octafluoro-pentanol | 379 nm |
| (53) | 373.5 nm (chloroform) | 4.7 | Octafluoro-pentanol | 380.5 nm |

Thus, when recording of information on the optical recording medium of the present invention is carried out by means of a short wavelength laser beam having a wavelength of from 350 nm to 530 nm, it is possible to record or read a large quantity of information with a higher density.

The entire disclosure of Japanese Patent Application No. 2003-291973 filed on Aug. 12, 2003 including specification, claims, drawings and summary is incorporated herein by reference in its entirety.

What is claimed is:

1. An optical recording medium comprising a substrate and a recording layer capable of recording or reading information by a laser, formed on the substrate, characterized in that the recording layer contains a compound represented by the following formula (1):

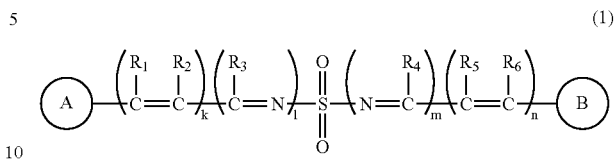

wherein each of $R_1$ to $R_6$ which are independent of one another, is a hydrogen atom or a linear or branched alkyl group which may be substituted, each of k and n which are independent of each other, is an integer of from 0 to 2, provided $0 \leq k+n \leq 4$, each of l and m which are independent of each other, is 0 or 1, provided $1 \leq l+m \leq 2$, each of rings A and B which are independent of each other, is an aromatic ring which may have optional substituents, provided that such optional substituents may be bonded to each other to form a ring.

2. The optical recording medium according to claim 1, wherein in the above formula (1), each of $R_1$ to $R_6$ is a hydrogen atom or a non-substituted $C_{1-3}$ linear alkyl group.

3. The optical recording medium according to claim 1, wherein in the above formula (1), each of k and n which are independent of each other, is 0 or 1, provided $0 \leq k+n \leq 2$.

4. The optical recording medium according to claim 1, wherein in the above formula (1), each of rings A and B which are independent of each other, is a 5- or 6-membered single ring or 2 or 3 condensed ring, which may have optional substituents, provided that the optional substituents may be bonded to each other to form a ring.

5. An optical recording method characterized in that recording of information on the optical recording medium as defined in claim 1 is carried out by using a laser beam having a wavelength of from 350 nm to 530 nm.

* * * * *